(12) United States Patent
Heo et al.

(10) Patent No.: US 6,660,672 B2
(45) Date of Patent: Dec. 9, 2003

(54) ALKALI HALIDE-DOPED SULFIDE GLASSES FOR OPTICAL AMPLIFIER AND FABRICATING METHOD THEREOF

(75) Inventors: Jong Heo, Kyongsangbuk-do (KR); Dong-Chin Lee, Pusan-kwangyokshi (KR); Hye-Sun Lee, Seoul (KR); Sun-Tae Jung, Kyonggi-do (KR)

(73) Assignee: Samsung Electronics Co LTD, Suwon (KR)

( * ) Notice: Subject to any disclaimer, the term of this patent is extended or adjusted under 35 U.S.C. 154(b) by 0 days.

(21) Appl. No.: 09/877,825

(22) Filed: Jun. 8, 2001

(65) Prior Publication Data

US 2002/0025898 A1 Feb. 28, 2002

(30) Foreign Application Priority Data

Jul. 6, 2000 (KR) ........................... P2000/38691

(51) Int. Cl.$^7$ ................................................. C03C 3/32
(52) U.S. Cl. ............................................. 501/40
(58) Field of Search ................................... 501/40

(56) References Cited

U.S. PATENT DOCUMENTS

| | | | |
|---|---|---|---|
| 5,379,149 A | | 1/1995 | Snitzer et al. ............. 359/341 |
| 5,389,854 A | * | 2/1995 | True ........................... 313/36 |
| 5,392,376 A | * | 2/1995 | Aitken et al. ............. 385/142 |
| 6,148,125 A | * | 11/2000 | Heo et al. ................. 359/341.5 |
| 6,347,177 B1 | * | 2/2002 | Heo et al. ................. 385/123 |

FOREIGN PATENT DOCUMENTS

| | | | |
|---|---|---|---|
| EP | 1022823 A | * | 7/2000 |
| GB | 2342771 A | | 4/2000 |
| JP | 2000-124555 A | * | 4/2000 |
| WO | WO 97/03028 | | 1/1997 |

OTHER PUBLICATIONS

Wang, J. et al.; "Halide–modified Ga–La sulfide glasses with improved fiber–drawing and optical properties for $Pr^{3+}$–doped fiber amplifiers at 1.3 $\mu$m"; Applied Physics Letters, American Institute of Physics, New York, US, Sep. 29, 1997, vol. 71, No. 13, pp. 1753–1755.

Heo, Jong et al.; "Ultra–low phonon energy glasses for the high performance 1.3 $\mu$m–window amplifiers"; Optical Fiber Communication Conference, Trends in Optics and Photonics, 2000, vol. 37, pp. 221–223.

Heo, Jong et al.; "$Dy^{3+}$–doped Ge–Ga–S–KBr(or CsBr) glasses for the 1.3 $\mu$m fiber amplifier materials"; Optical Fiber Communication Conference and the International Conference on Integrated Optics and Optical Fiber Communications, 1999, vol. 2, pp. 120–122.

Marchese, Diego et al.; "$^1G_4$ lifetimes, optical and thermal characteristics of Pr–doped $GeS_2$–chalcohalide glasses"; Journal of Non–Crystalline Solids, North–Holland Physics Publishing, Amsterdam, NL, 1996, vol. 196, pp. 314–319.

* cited by examiner

Primary Examiner—David Sample
(74) Attorney, Agent, or Firm—Cha & Reiter (57) ABSTRACT

There is provided alkaloid halogen-doped sulfide glasses for an optical amplifier and a fabricating method thereof. An alkaloid halogen-doped sulfide glass is formed of silica doped with a Ge—Ga—S three-component system, $Pr^{3+}$, and an alkaloid halogen. To fabricate the alkaloid halogen-doped sulfide glass for an optical amplifier, silica doped with Ge, Ga, S, $Pr^{3+}$, and an alkaloid halogen as a starting material is filled into a container. The container is sealed in a vacuum and the starting material in the container is fused by heating the container. The container is cooled and the starting material is sintered by heating the container at a glass transition temperature.

7 Claims, 10 Drawing Sheets

FIG. 10 ions excited to $_1G^4$ experiences radiation-less
ALKALI HALIDE-DOPED SULFIDE GLASSES FOR OPTICAL AMPLIFIER AND FABRICATING METHOD THEREOF

CLAIM OF PRIORITY

This application makes reference to and claims all benefits accruing under 35 U.S.C. Section 119 from an application entitled, "Alkaloid Halogen-Doped Sulfide Glasses for Opitical Amplifier and Fabricating Method thereof," filed in the Korean Industrial Property Office on Jul. 6, 2000 and there duly assigned Serial No. 2000-38691.

BACKGROUND OF THE INVENTION

1. Field of the Invention

The present invention relates generally to sulfide glasses and a fabricating method thereof. More particularly, the present invention relates to sulfide glasses used as an optical amplifier and the fabricating method thereof.

2. Description of the Related Art

The following list of literature reference is indicative of the extensive research conducted in recent years in the field of sulfide-containing glasses.

<References>

1. "High-Gain Rare Earth Doped Fiber Amplifier Operating at 1.54 $\mu$m", in Tech. Digest of Conference on Optical Fiber Communication, Reno Nevada (Optical Society of America. Washington, D.C.), W12, 167 (1987) by R. J. Mears, L. Leekie, I. M. Jauncey, and D. N. Payne.

2. "Amplification and Lasing at 1350 nm in Neodymium Doped Fluorozirconate Fiber", Electron. Lett. 24, 438 (1988) by M. C. Brierley and C. A. Millar.

3. "$Pr^{3+}$—doped Fluoride Fibre Amplifier Operating at 1.31 $\mu$m", Opt. Lett. 16, 1747 (1991) by Y. Ohoshi, T. Kanamori, T. Kitagawa, S. Takahashi, E. Snitzer, and G. H. Sigel, Jr.

4. "Amplification at 1.3 $\mu$m in a $Pr^{3+}$—Doped Single Mode Fluorozirconate Fibre", Electronics Letters vol. 27, no. 8, 628 (1991) by S. F. Carter, D. Szebesta, S. T. Davey, R. Wyatt, M. C. Brierley, and P. W. France.

5. "$Pr^{3+}$: La—Ga—S Glass: A Promising Material for 1.3 $\mu$m Fiber Amplification", in Tech. Digest of Topical Meeting Optical Amplifiers and their Applications. PDP5 (1992) by P. C. Becker, M. M. Broer, V. C. Lambrecht, A. J. Bruce, and C. Nykolak.

6. "$Pr^{3+}$—Doped Ge—Ga—S Glasses for 1.3 $\mu$m Optical Fiber Amplifiers", J. Non-Cryst. Solids, 182, 257 (1995) by K. Wei, D. P. Macherwirth, J. Wenzel, E. Snitzer, and G. H. Sigel, Jr.

7. Spectroscopy and Quantum Efficiency of Halide-Modified Gallium-Lanthanium Sulfide Glasses Doped with Praseodymium", J. Non-Cryst. Solids, 239, 176 (1998) by J. R. Hector, J. Wang, D. Brady, M. Kluth, D. W. Hewak, W. S. Brocklesby, and D. N. Payne.

In general, an optical communication system operates at the zero dispersion wavelength band, 1.31 $\mu$m, and a minimum loss wavelength band, 1.5 $\mu$m of silica glass, as an optical wave-guide material [See reference 1]. Particularly in the 1.31 $\mu$m wavelength band, the rare-earth ions of $Nd^{3+}$, $Dy^{3+}$, and $Pr^{3+}$ exhibit fluorescence transition. Efforts have been made toward utilization of these rare-earth ions.

With reference to $Nd^{3+}$, the central wavelength of fluorescence resulting from transition from the energy level of $_4F^{3/2}$ to $_4F^{13/2}$ is 1.35 $\mu$m, which is different from the zero dispersion wavelength band of silica glass. Moreover, the probability of fluorescence emission at 1.31 $\mu$m is only one fifth of the fluorescence emission probability at 0.89 $\mu$m and 1.064 $\mu$m that are simultaneously generated at $_4F^{3/2}$. The gain at 1.31 $\mu$m drops due to a strong, excited state absorption [See reference 2].

$Dy^{3+}$ produces fluorescence at 1.31 $\mu$m across an induced emission area that is four times larger than $Pr^{3+}$, and has a high branching ratio relative to other rare-earth elements. Despite these advantages, $Dy^{3+}$ has a very narrow energy difference, about 1800 $cm^{-1}$ between the fluorescence levels of 1.31 $\mu$m, $_4F^{11/2}$ or $_6H^{9/2}$, and the nearest lower energy level $_6H^{11/2}$s. Here, the resulting multiphonon relaxation leads to energy loss. Consequently, $Dy^{3+}$ has only 10% of the fluorescence lifetime of $Pr^{3+}$, which are low fluorescence efficiency and a low gain coefficient needed for light amplification.

While $Pr^{3+}$ induces fluorescence at 1.31 $\mu$m utilizing transition $_1G^4$ to $_3H^5$ and has a much higher 1.31 $\mu$m fluorescence transition probability than other fluorescence transition probabilities, it also has a narrow energy difference, 3000 $cm^{-1}$ between $_1G^4$ and $_3F^4$. Thus, when an oxide glass having a phonon energy of 800 $cm^{-1}$ or above is used as a base material, it is highly probable that the energy of $Pr^{3+}$ ions excited to $_1G^4$ experiences radiation-less transition due to the multiphonon relaxation, which results in the decrease of optical amplification efficiency. To solve the problem, a fluoride glass or a sulfide glass that has low phonon energy was suggested as a base material. However, the use of the fluoride glass as a base material can not produce high optical amplification efficiency because its quantum efficiency is very low, 4%. The sulfide glass as a base material is not effective in achieving high optical amplification efficiency due to its short fluorescence lifetime, 300 $\mu$s at $_1G^4$ [See references 3 to 7].

Figure 1:
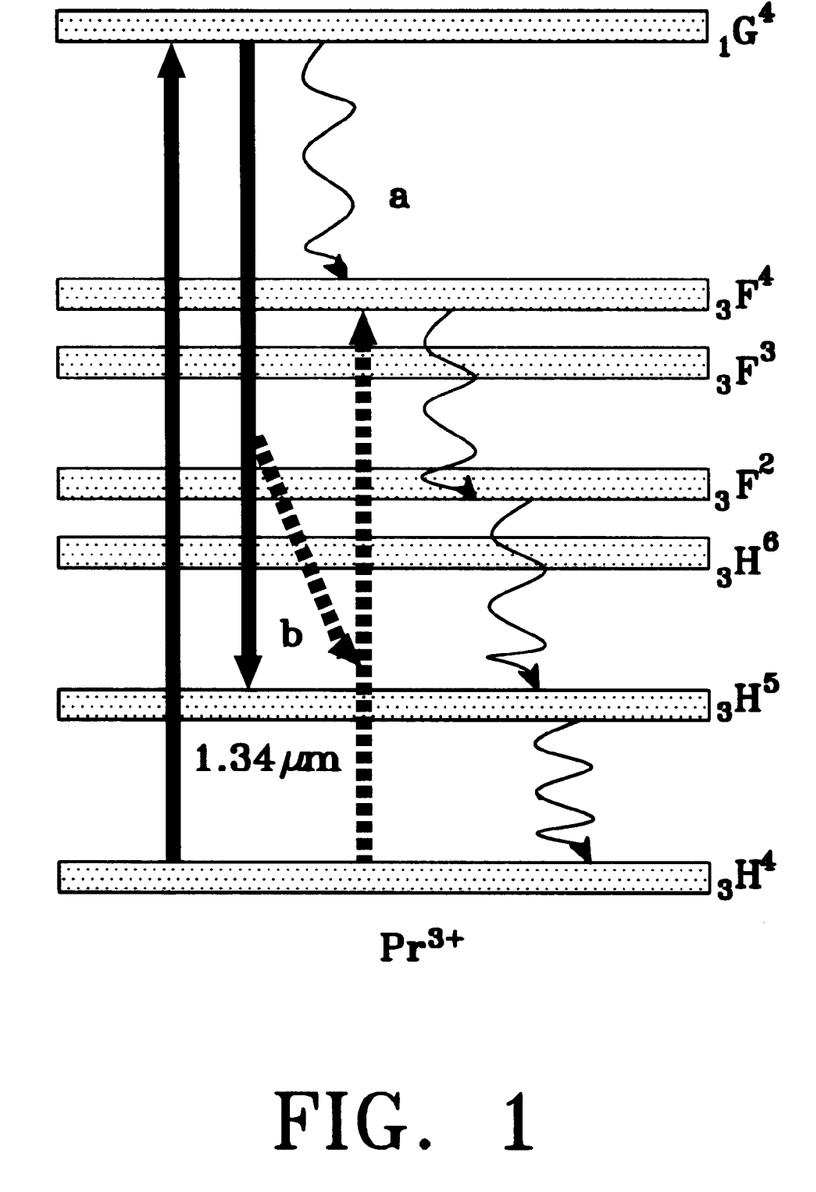
FIG. 1 illustrates the multiphonon relaxation of $Pr^{3+}$ between the energy levels and an energy transfer between $Pr^{3+}$ ions.

FIG. 1 illustrates the multiphonon relaxation of $Pr^{3+}$ between energy levels, and the energy transfer between $Pr^{3+}$ ion. The 1.31 $\mu$m fluorescence lifetime and the optical amplification efficiency of $Pr^{3+}$ at $_1G^4$ are much influenced by radiation-less transition in which energy excited to $_1G^4$ is consumed in a form other than light. The radiation-less transition refers to the multiphonon relaxation of phonon energy, as indicated reference character a, and the energy transfer between adjacent $Pr^{3+}$ ions, as indicated by reference character b in FIG. 1. The multiphonon relaxation is a dominant factor that decreases the optical amplification efficiency.

SUMMARY OF THE INVENTION

The present invention provides alkali halide-doped sulfide glasses to be used as an optical amplifier and its fabricating method to extend fluorescence lifetime by eliminating the multiphonon relaxation, thus increasing the optical amplification efficiency of the optical amplifier.

The present invention can be achieved by providing alkali halide-doped sulfide glasses for an optical amplifier and a fabricating method thereof. An alkaloid halogen-doped sulfide glass is formed of silica doped with a Ge—Ga—S three-component system, $Pr^{3+}$, and an alkali halide. To fabricate alkali halide-doped sulfide glass for an optical amplifier, silica doped with Ge, Ga, S, $Pr^{3+}$, and an alkali halide as a starting material is filled into a container. The container is sealed in a vacuum and the starting material in the container is fused by heating the container. The container is cooled and the starting material is sintered by heating the container at a glass transition temperature.

According to one aspect of the present invention, the $Pr^{3+}$ and alkali halide-doped sulfide comprises a mixture of GeGaS and CsBr, expressed in terms of mole percent on the sulfide basis, and is selected from the group consisting of 90–92% ($Ge_{0.25}Ga_{0.10}S_{0.65}$) and 8–10% (CsBr); 94.5–96.0% ($Ge_{0.29}Ga_{0.05}S_{0.66}$) and 4–5.5% (CsBr); and, 84.2–85.25% ($Ge_{0.18}Ga_{0.18}S_{0.64}$) and 14.75–15.75% (CsBr).

According to another aspect of the invention, the $Pr^{3+}$ and alkali halide-doped sulfide glass comprises a mixture of GeGaS and KBr, expressed in terms of mole percent on the sulfide basis, and comprises 90.91% ($Ge_{0.25}Ga_{0.10}S_{0.65}$) and 9.09% (KBr).

According to a further aspect of the invention, the $Pr^{3+}$ and alkali halide-doped sulfide glass comprises a mixture of GeAsGaS and CsBr, expressed in terms of mole percent on the sulfide basis, and comprises 98% ($Ge_{0.30}As_{0.06}Ga_{0.028}S_{0.62}$) and 2%(CsBr).

Preferably, the alkali halide-doped is CsBr or Kbr.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. For the purpose of clarity, well-known functions or constructions are not described in detail as they would obscure the invention in unnecessary detail.

Alkali halide-doped sulfide glass for an optical amplifier according to the present invention is formed of a rare-earth element $Pr^{3+}$, a three-component system Ge—Ga—S showing high solubility with respect to $Pr^{3+}$, and an alkaloid halogen CsBr or KBr for decreasing the multiphonon relaxation of $Pr^{3+}$. Also, in the embodiment of the present invention, it can be contemplated that the Ge—Ga—S three-component system is further doped with As.

With reference to FIG. 1, the alkali halide, CsBr or KBr, serves to decrease the multiphonon relaxation rate of $Pr^{3+}$ from $^1G_4$ to lower levels $_3F^4$ and $_3F^3$. By decreasing the multiphonon relaxation through the provision of the alkali halide in the sulfide glass, the present invention is able to provide higher optical amplification efficiency to the sulfide glass.

Figure 2:
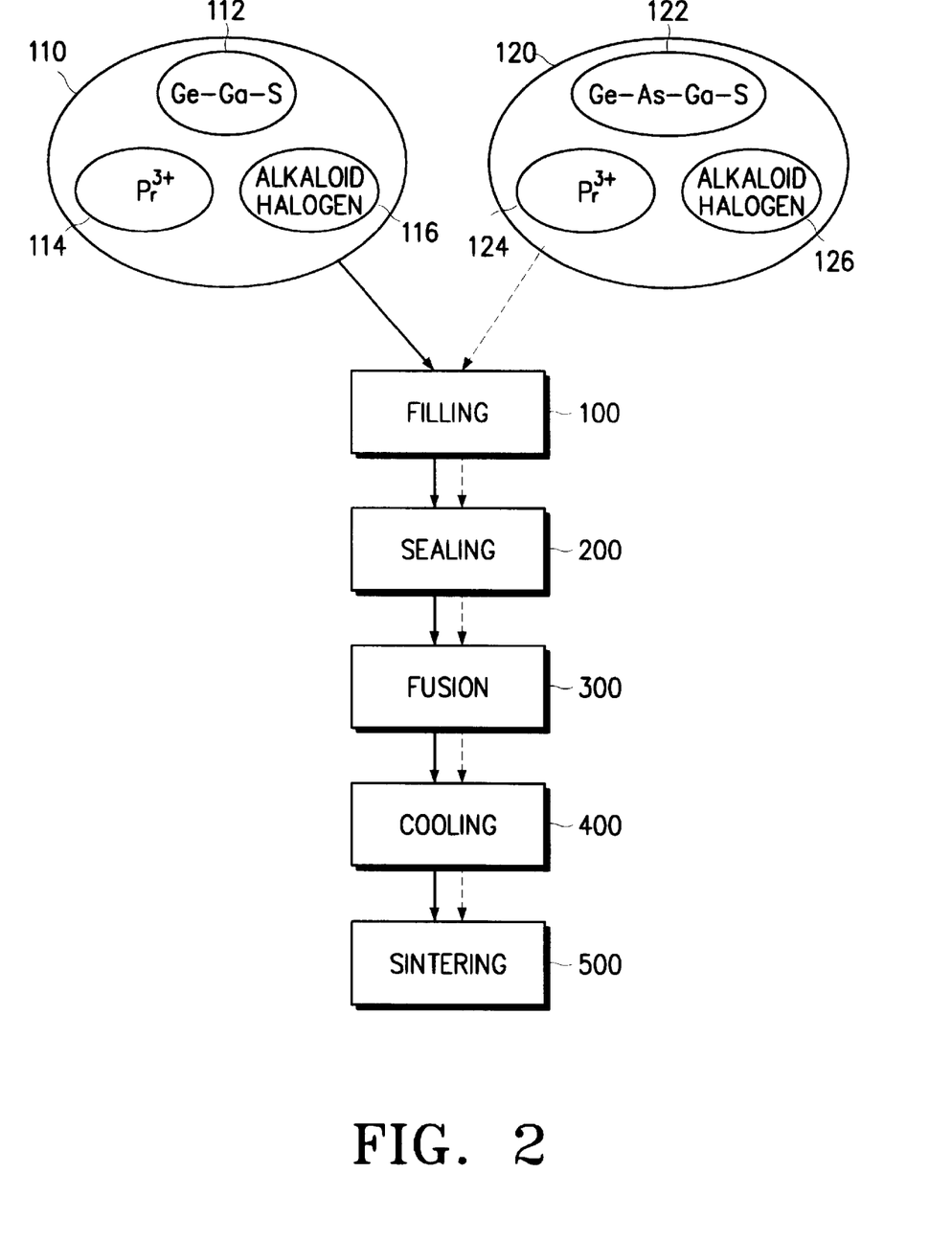
FIG. 2 is a flowchart illustrating a flow chart for fabricating alkaloid halogen-doped sulfide glasses for an optical amplifier according to the present invention.

FIG. 2 is a flowchart illustrating a method of fabricating alkali halide-doped sulfide glasses to be used as an optical amplifier according to the present invention. The sulfide glass fabricating method mainly includes the steps of filling (step 100), sealing (step 200), fusion (step 300), cooling (step 400), and sintering (step 500).

In step 100, silica doped with Ge, Ga, S, and $Pr^{3+}$ or Ge, Ga, As, S, and $Pr^{3+}$ and an alkali halide as a starting material is filled in a container. As shown in FIG. 2, a first starting material 110 is silica doped with the Ge—Ga—S three component-system 112, $Pr^{3+}$ 114, and the alkali halide 116, and a second starting material 120 is silica doped with the Ge—Ga—As—S four-component system 122, $Pr^{3+}$ 124, and the alkali halide 126.

The composition of the Ge—Ga—S 112 is preferably $Ge_{0.25}Ga_{0.10}S_{0.65}$, $Ge_{0.29}Ga_{0.05}S_{0.66}$, or $Ge_{0.18}Ga_{0.18}S_{0.64}$. The composition of Ge—As—Ga—S 122 is preferably $Ge_{0.30}As_{0.06}Ga_{0.02}S_{0.62}$. Here, the composition is expressed in terms of mole fraction. Preferably, CsBr or KBr is used as the alkali halide 116 and 126. In the embodiment of the present invention, the alkali halide 116 and 126 increase the fluorescence lifetime of sulfide glass by drastically decreasing the multiphonon relaxation rate of $Pr^{3+}$ from $_1G^4$ to $_3F^4$ and $_3F^3$. The filling step 100 is preferably performed at an Ar atmosphere and the container is a silicon ampule.

In step 200, the container having the starting material is sealed in a vacuum, and the starting material is fused by heating the sealed container in step 300.

The container filled with the fused starting material is cooled in a water tank in step 400, and the cooled starting material is melted by heating the container at a glass transition temperature in step 500.

<Embodiment 1>

The starting material includes the Ge—Ga—S three-component system of 99.999% in purity, CsBr of 99.9% in purity, and Pr ions. In the first embodiment of the present invention, the composition ratio of the three-component system and CsBr is set to 0.92–0.08CsBr, and Pr is 300 ppm (parts per million). 7 g of the starting material is measured out at the Ar atmosphere inside a glove box, filled into a silica ampule, and sealed in vacuum. The silica ampule is fused at 950° C. for 12 hours in an agitator, water-cooled, and then sintered at a glass transition temperature or about one hour. Through the above process, the inventive optical amplifier glass is formed.

Figure 3:
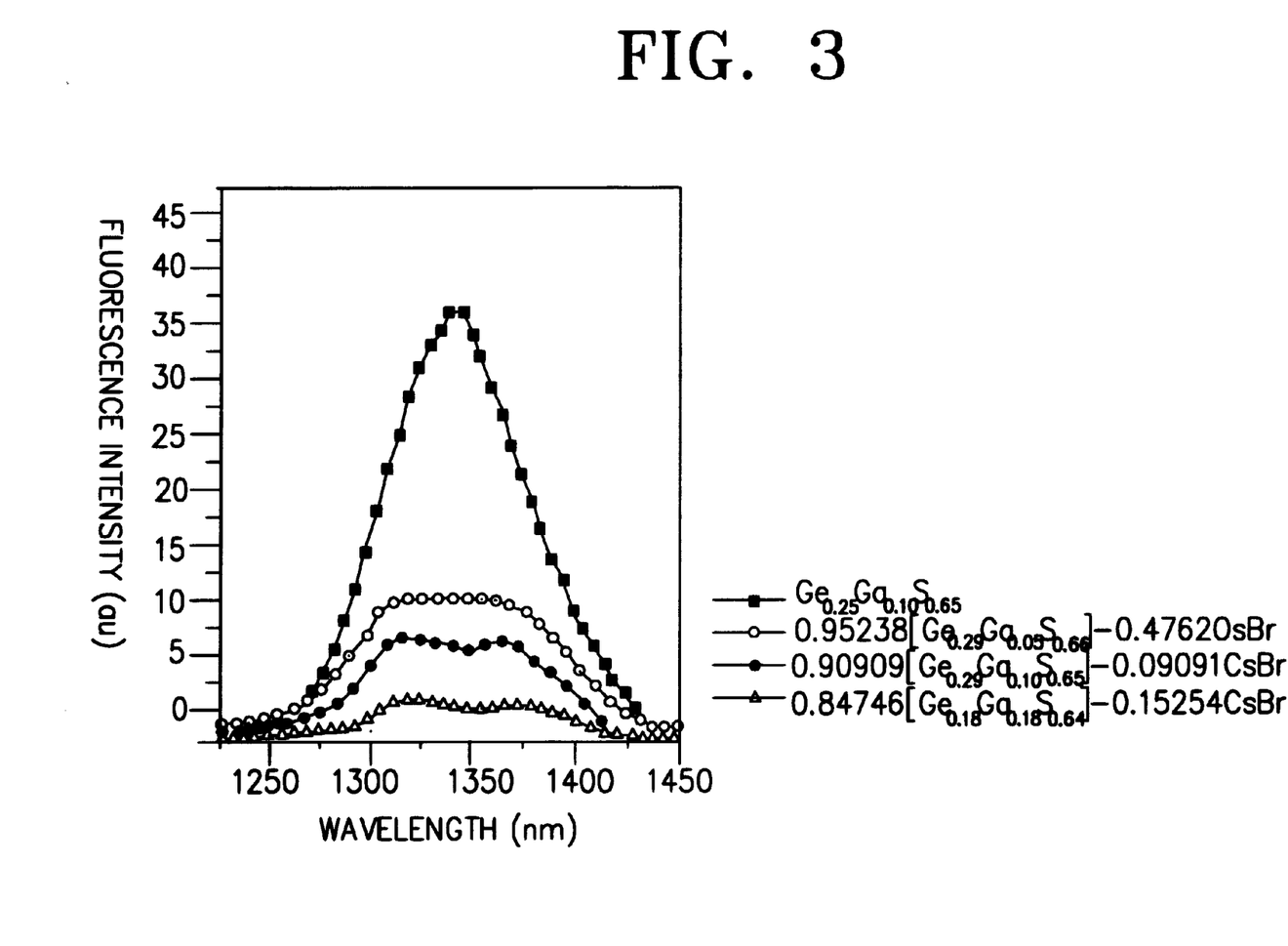
FIGS. 3 to 8 are graphs showing the fluorescence spectrums of the sulfide glasses fabricated according to various preferred embodiments of the present invention; and, FIGS. 9 and 10 are graphs showing changes of the fluorescence intensity of sulfide glasses fabricated according to a few preferred embodiments of the present invention.

The fluorescence lifetime of a conventional $Ge_{0.25}Ga_{0.10}S_{0.65}$ glass doped with 300 ppm of Pr is 335 µs, while the fluorescence lifetime of the sulfide glass according to the first embodiment of the present invention is 345 µs, as shown in Table 1 below. A longer fluorescence lifetime is achieved by minimizing the multiphonon relaxation rate of Pr from $_1G^4$ to $_3F^4$ through the provision of the alkaloid halogen CsBr. FIG. 3 and Table 1 illustrate the fluorescence spectrum and fluorescence lifetime of the sulfide glass for an optical amplifier according to the first embodiment of the present invention.

(Table 1)

TABLE 1

| embodiments | composition | doped ratio: Ga (%) | compar- ison | CsBr (%) | fluores- cence life- time (µs) |
|---|---|---|---|---|---|
| 1 | $Ge_{0.25}Ga_{0.10}S_{0.65}$ | 9.2 | > | 8 | 345 |
| 2 | $Ge_{0.25}Ga_{0.10}S_{0.65}$ | 9.091 | = | 9.091 | 1155 |
| 3 | $Ge_{0.25}Ga_{0.10}S_{0.65}$ | 9 | < | 10 | 1169 |
| 4 | $Ge_{0.29}Ga_{0.05}S_{0.66}$ | 4.8 | > | 4 | 378 |

TABLE 1-continued

| embodiments | composition | doped ratio: Ga (%) | compar­ison | CsBr (%) | fluores­cence life­time ($\mu s$) |
|---|---|---|---|---|---|
| 5 | $Ge_{0.29}Ga_{0.05}S_{0.66}$ | 4.762 | = | 4.762 | 739 |
| 6 | $Ge_{0.29}Ga_{0.05}S_{0.66}$ | 4.725 | < | 5.5 | 1106 |
| 7 | $Ge_{0.18}Ga_{0.18}S_{0.64}$ | 15.345 | > | 14.75 | 973 |
| 8 | $Ge_{0.18}Ga_{0.18}S_{0.64}$ | 15.254 | = | 15.254 | 1188 |
| 9 | $Ge_{0.18}Ga_{0.18}S_{0.64}$ | 15.165 | < | 15.75 | 1261 |
| 10 | $Ge_{0.30}As_{0.06}Ga_{0.028}S_{0.62}$ | 1.96 | < | 2 | 465 |

Table 1 lists compositions of starting materials, doped rations of Ga and an alkaloid halogen and the fluorescence lifetime of the resulting sulfide glasses in the embodiments of the present invention using CsBr as the alkaloid halogen.

<Embodiment 2>

Figure 4:
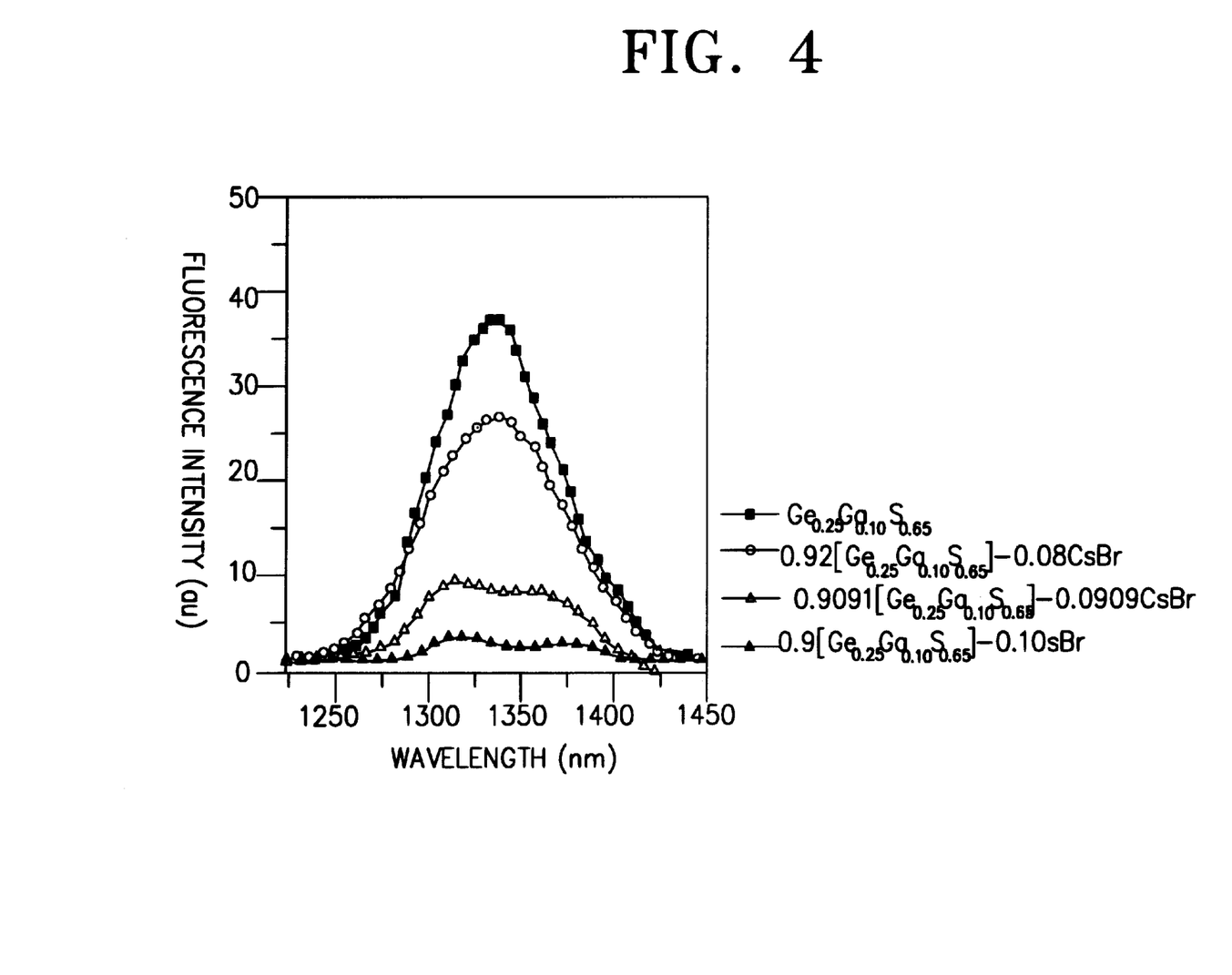

According to a second embodiment of the present invention, the composition ratio of the three-component system and CsBr is set to $0.9091[Ge_{0.25}Ga_{0.10}S_{0.65}]$-$0.0909CsBr$ with Ga/CsBr=1 and the amount of Pr is 300 ppm. An optical amplifier glass is formed in the same manner as in the first embodiment of the present invention. FIG. 4 and Table 1 illustrate the fluorescence spectrum and fluorescence lifetime of the sulfide glass for an optical amplifier according to the second embodiment of the present invention. As shown in Table 1, the measured fluorescence lifetime of the sulfide glass according to the second embodiment of the present invention is 1155 $\mu s$.

<Embodiment 3>

According to a third embodiment of the present invention, the composition ratio of the three-component system and CsBr is set to $0.90[Ge_{0.25}Ga_{0.10}S_{0.65}]$-$0.10CsBr$ with Ga/CsBr<1 and the amount of Pr is 300 ppm. An optical amplifier glass is formed in the same manner as in the first embodiment of the present invention.

FIG. 4 and Table 1 illustrate the fluorescence spectrum and fluorescence lifetime of the sulfide glass for an optical amplifier according to the third embodiment of the present invention. As shown in Table 1, the measured fluorescence lifetime of the sulfide glass according to the third embodiment of the present invention is 1169 $\mu s$. The sulfide glass according to the third embodiment of the present invention has the longest fluorescence lifetime of all the sulfide glasses according to the embodiments of the present invention, because CsBr drastically decreases the multiphonon relaxation rate of Pr from $^1G_4$ to lower levels $_3F^4$ and $_3F^3$. As more CsBr is doped, the peak of the 1.34-$\mu m$ fluorescence spectrum of $Pr^{3+}$ at $^1G_4$ branches into two parts. Here, the central frequencies of the two peaks are 1310 nm and 1360 nm, respectively.

<Embodiment 4>

Figure 5:
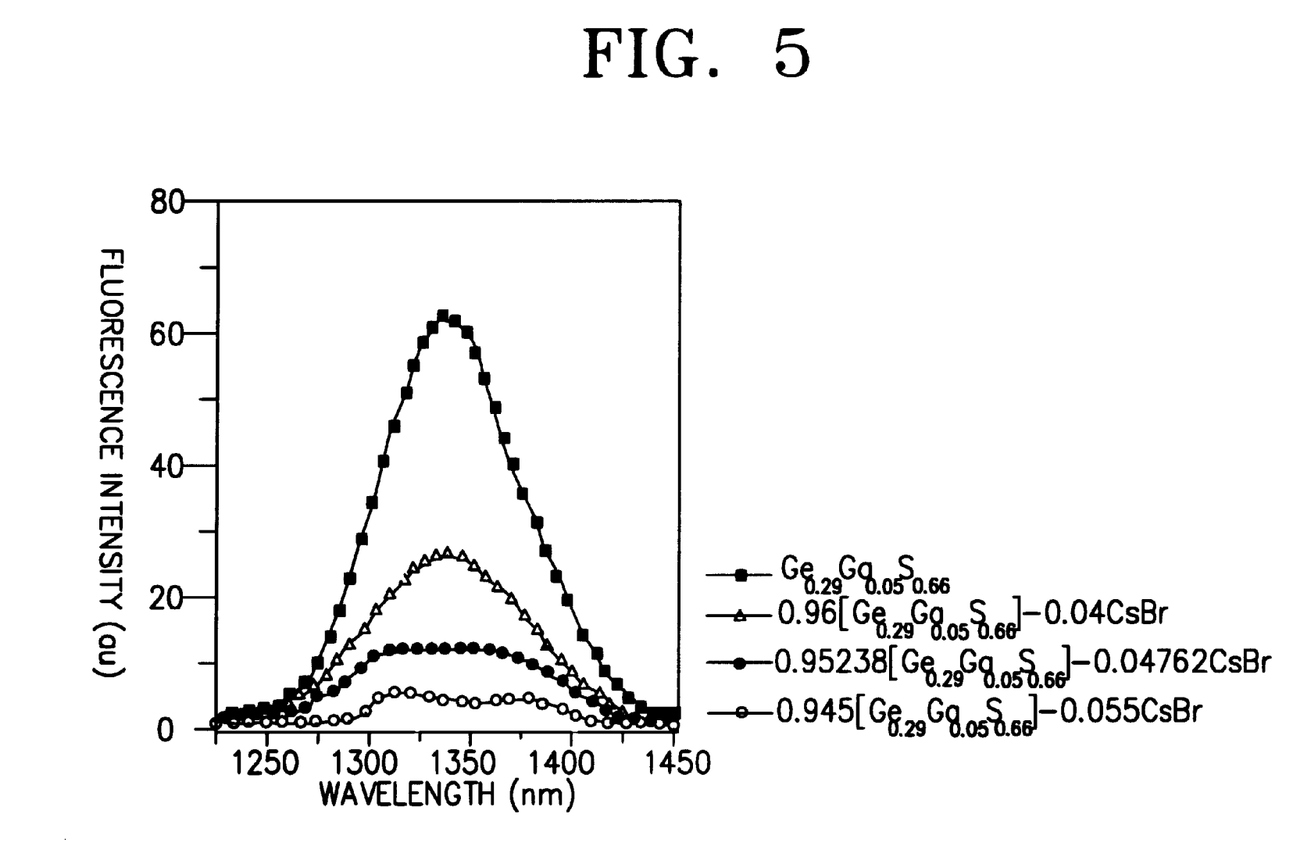

According to a fourth embodiment of the present invention, the composition ratio of the three-component system and CsBr is set to $0.96[Ge_{0.29}Ga_{0.05}S_{0.66}]$-$0.04CsBr$ with Ga/CsBr>1 and the amount of Pr is 300 ppm. An optical amplifier glass is formed in the same manner as in the first embodiment of the present invention. FIG. 5 and Table 1 illustrate the fluorescence spectrum and fluorescence lifetime of the sulfide glass for an optical amplifier according to the fourth embodiment of the present invention. As shown in Table 1, the measured fluorescence lifetime of the sulfide glass according to the fourth embodiment of the present invention is 378 $\mu s$.

<Embodiment 5>

According to a fifth embodiment of the present invention, the composition ratio of the three-component system and CsBr is set to $0.95238[Ge_{0.29}Ga_{0.05}S_{0.66}]$-$0.04762CsBr$ with Ga/CsBr=1 and the amount of Pr is 300 ppm. An optical amplifier glass is formed in the same manner as in the first embodiment of the present invention. FIG. 5 and Table 1 illustrate the fluorescence spectrum and fluorescence lifetime of the sulfide glass for an optical amplifier according to the fifth embodiment of the present invention. As shown in Table 1, the measured fluorescence lifetime of the sulfide glass according to the fifth embodiment of the present invention is 739 $\mu s$.

<Embodiment 6>

According to a sixth embodiment of the present invention, the composition ratio of the three-component system and CsBr is set to $0.945[Ge_{0.29}Ga_{0.05}S_{0.66}]$-$0.055CsBr$ with Ga/CsBr<1 and the amount of Pr is 300 ppm. An optical amplifier glass is formed in the same manner as in the first embodiment of the present invention. FIG. 5 and Table 1 illustrate the fluorescence spectrum and fluorescence lifetime of the sulfide glass for an optical amplifier according to the sixth embodiment of the present invention. As shown in Table 1, the measured fluorescence lifetime of the sulfide glass according to the sixth embodiment of the present invention is 1106 $\mu s$.

<Embodiment 7>

Figure 6:
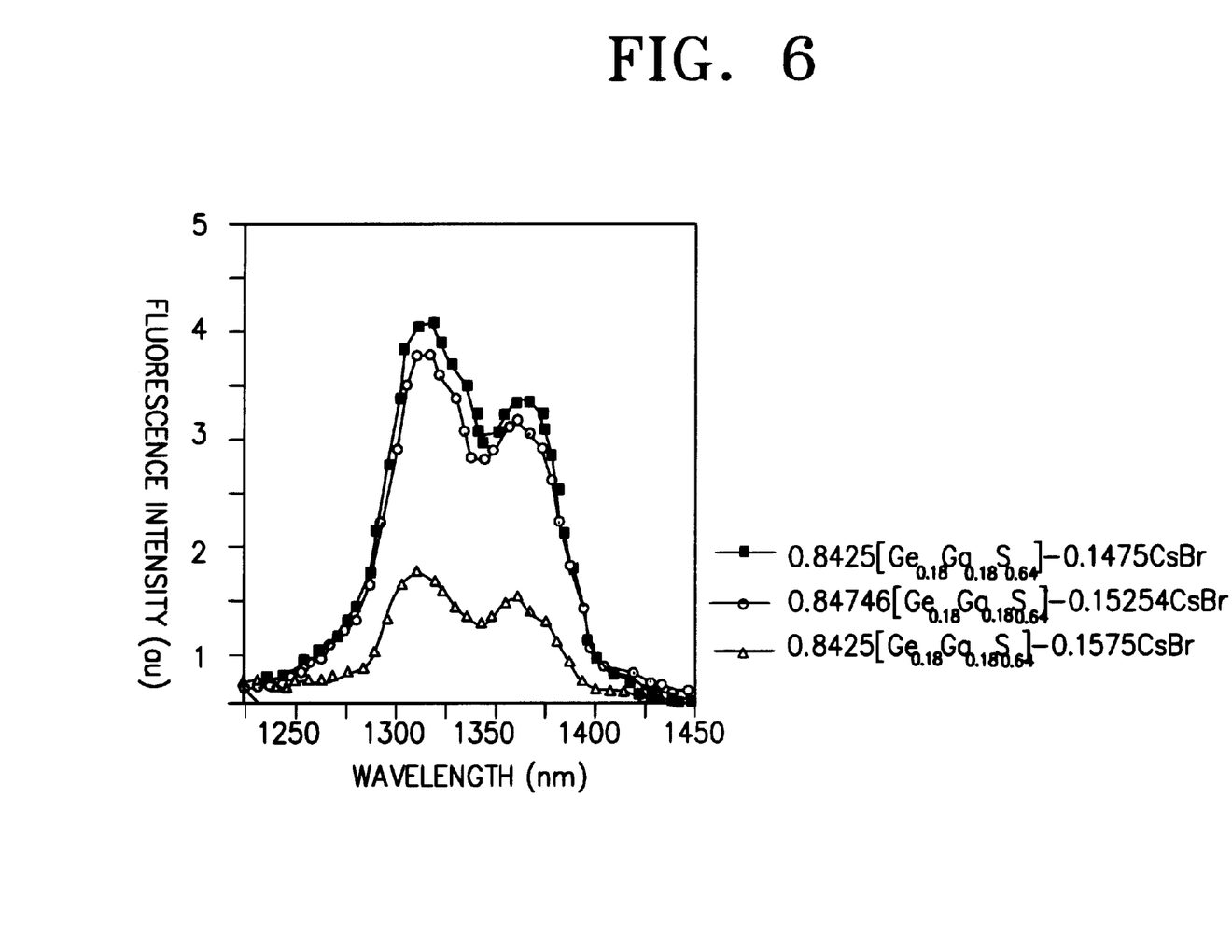

According to a seventh embodiment of the present invention, the composition ratio of the three-component system and CsBr is set to $0.8525[Ge_{0.18}Ga_{0.18}S_{0.64}]$-$0.1475CsBr$ with Ga/CsBr>1 and the amount of Pr is 300 ppm. An optical amplifier glass is formed in the same manner as in the first embodiment of the present invention. FIG. 6 and Table 1 illustrate the fluorescence spectrum and fluorescence lifetime of the sulfide glass for an optical amplifier according to the seventh embodiment of the present invention. As shown in Table 1, the measured fluorescence lifetime of the sulfide glass according to the seventh embodiment of the present invention is 973 $\mu s$.

<Embodiment 8>

According to an eighth embodiment of the present invention, the composition ratio of the three-component system and CsBr is set to $0.84746[Ge_{0.18}Ga_{0.18}S_{0.64}]$-$0.15254CsBr$ with Ga/CsBr=1 and the amount of Pr is 300 ppm. An optical amplifier glass is formed in the same manner as in the first embodiment of the present invention. FIG. 6 and Table 1 illustrate the fluorescence spectrum and fluorescence lifetime of the sulfide glass for an optical amplifier according to the eighth embodiment of the present invention. As shown in Table 1, the measured fluorescence lifetime of the sulfide glass according to the eighth embodiment of the present invention is 1188 $\mu s$.

<Embodiment 9>

According to a ninth embodiment of the present invention, the composition ratio of the three-component system and CsBr is set to $0.8425[Ge_{0.18}Ga_{0.18}S_{0.64}]$-$0.1575CsBr$ with Ga/CsBr<1 and the amount of Pr is 300 ppm. An optical amplifier glass is formed in the same manner as in the first embodiment of the present invention. FIG. 6 and Table 1 illustrate the fluorescence spectrum and fluorescence lifetime of the sulfide glass for an optical amplifier according to the ninth embodiment of the present invention. As shown in Table 1, the measured fluorescence lifetime of the sulfide glass according to the ninth embodiment of the present invention is 1261 $\mu s$.

<Embodiment 10>

Figure 7:
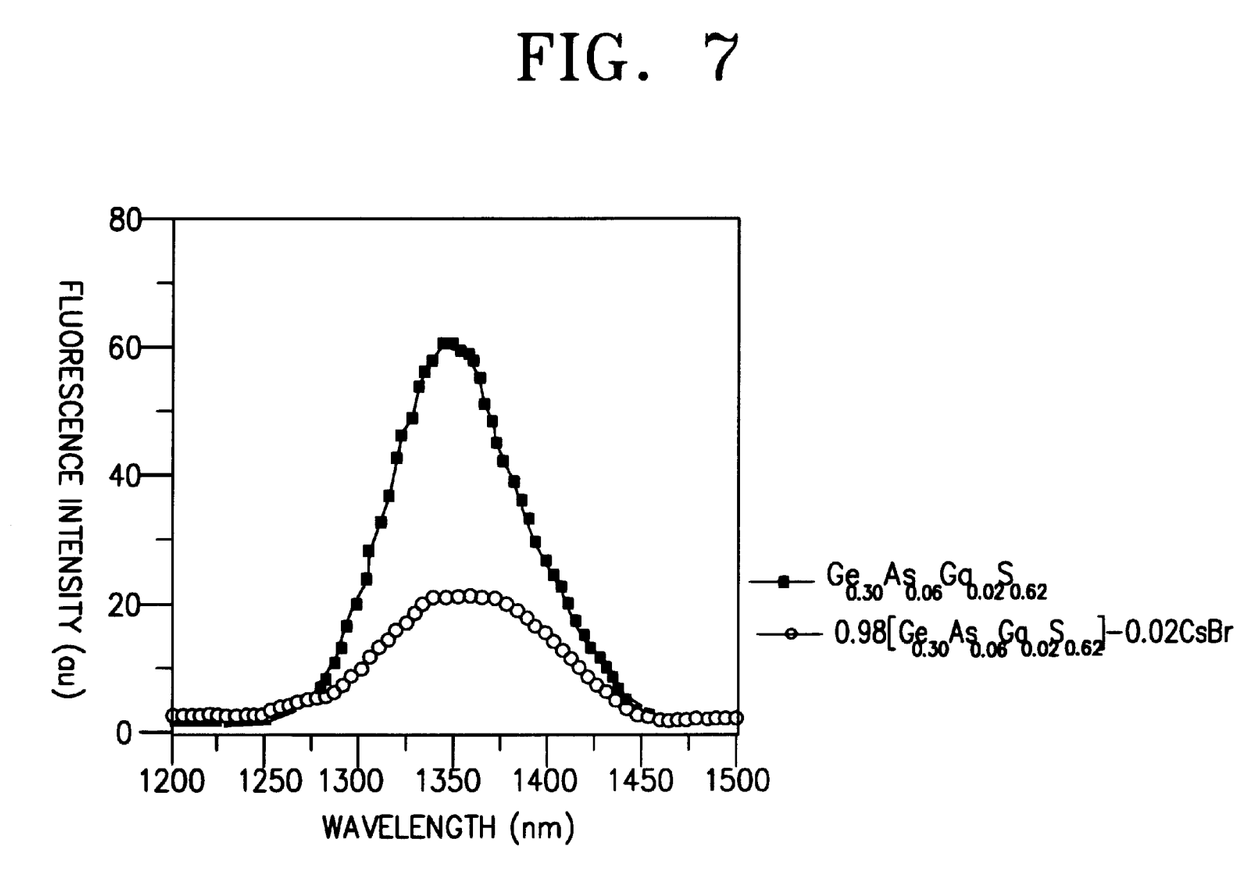

In the tenth embodiment of the present invention, the starting material includes the Ge—As—Ga—S four-component system of 99.999% in purity, CsBr of 99.9% in purity, and Pr. The composition ratio of the four-component system and CsBr is set to 0.98[$Ge_{0.30}As_{0.06}Ga_{0.02}S_{0.62}$]-0.02CsBr with Ga/CsBr<1 and the amount of Pr is 300 ppm. An optical amplifier glass is formed in the same manner as in the first embodiment of the present invention. FIG. 7 and Table 1 illustrate the fluorescence spectrum and fluorescence lifetime of the sulfide glass for an optical amplifier according to the tenth embodiment of the present invention. As shown in Table 1, the measured fluorescence lifetime of the sulfide glass according to the tenth embodiment of the present invention is 465 $\mu$s.

<Embodiment 11>

Figure 8:
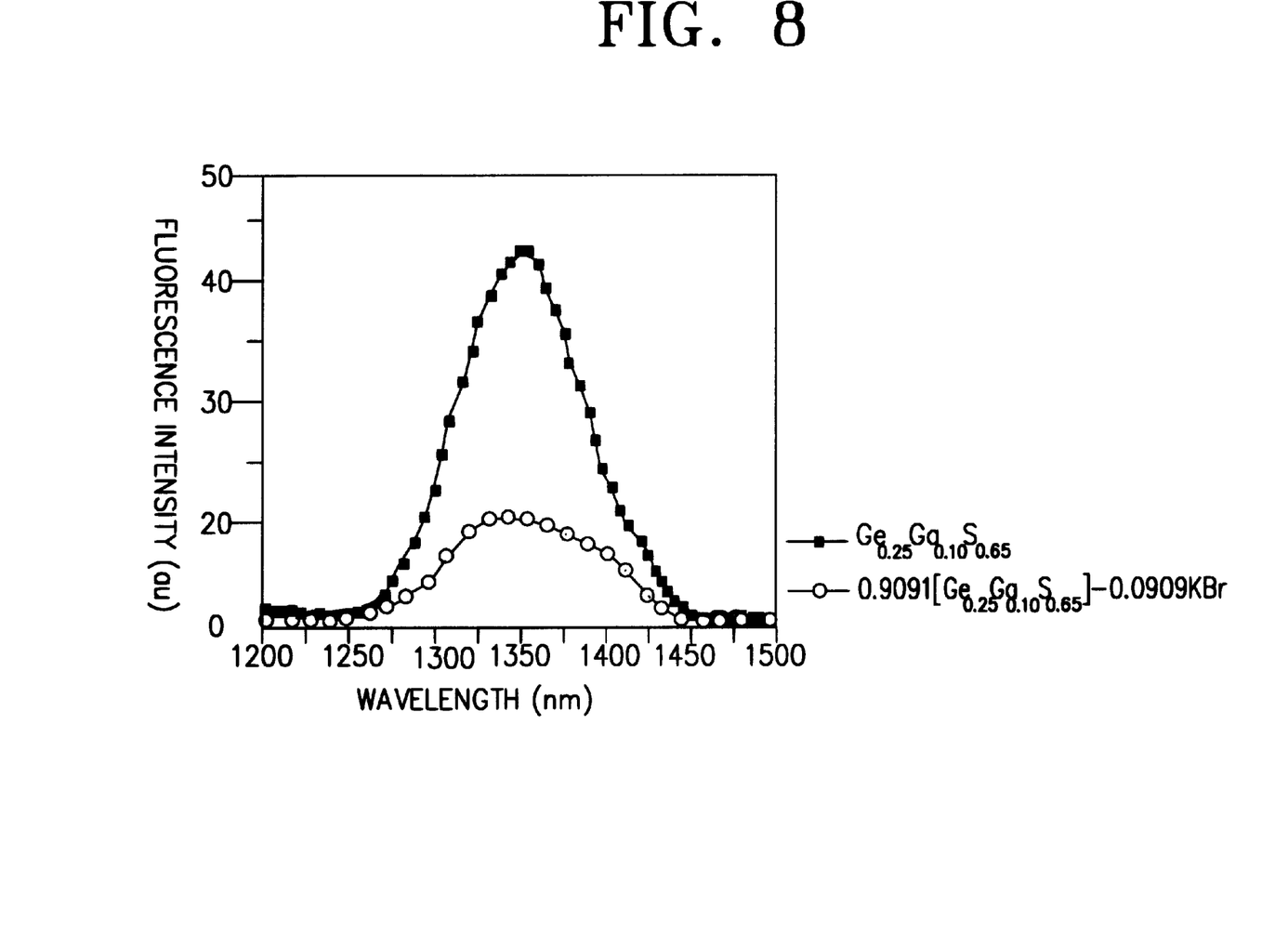

In the eleventh embodiment of the present invention, the starting material includes the Ge—Ga—S three-component system of 99.999% in purity, KBr of 99.9% in purity, and Pr. The composition ratio of the three-component system and KBr is set to 0.9091 [$Ge_{0.25}Ga_{0.10}S_{0.65}$]-0.0909KBr with Ga/KBr=1 and the amount of Pr is 300 ppm. An optical amplifier glass is formed in the same manner as in the first embodiment of the present invention. FIG. 8 and Table 2 illustrate the fluorescence spectrum and fluorescence lifetime of the sulfide glass for an optical amplifier according to the eleventh embodiment of the present invention. As shown in Table 2 below, the measured fluorescence lifetime of the sulfide glass according to the eleventh embodiment of the present invention is 479 $\mu$s.

TABLE 2

| embodiment | composition | doped ratio of Ga (%) | comparison | CsBr (%) | fluorescence lifetime ($\mu$s) |
|---|---|---|---|---|---|
| 11 | $Ge_{0.25}Ga_{0.10}S_{0.65}$ | 9.091 | = | 9.091 | 479 |

Table 2 lists the composition of a starting material, doping ratios of Ga and an alkaloid halogen, and the fluorescence lifetime of the resulting sulfide glass in the embodiment of the present invention using KBr as the alkaloid halogen.

FIGS. 3 to 8 illustrate the fluorescence spectrums of the sulfide glasses for an optical amplifier fabricated according to the conventional technology and according to the preferred embodiments of the present invention. FIG. 3 illustrates the fluorescence spectrum of the sulfide glass for an optical amplifier according to the first embodiment of the present invention. FIG. 4 illustrates the fluorescence spectrums of the sulfide glasses for an optical amplifier according to the second and third embodiments of the present invention. FIG. 5 illustrates the fluorescence spectrums of the sulfide glasses for an optical amplifier according to the fourth, fifth, and sixth embodiments of the present invention. FIG. 6 illustrates the fluorescence spectrums of the sulfide glasses for an optical amplifier according to the seventh, eighth, and ninth embodiments of the present invention. FIG. 7 illustrates the fluorescence spectrums of the sulfide glass for an optical amplifier according to the tenth embodiment of the present invention. FIG. 8 illustrates the fluorescence spectrums of the sulfide glass for an optical amplifier according to the eleventh embodiment of the present invention. To measure the fluorescence spectrums according to the present invention, a 1014-nm Ti-sapphire laser driven by an $Ar^+$ laser was used as an exciting light source. $Pr^{3+}$ in the sulfide glasses were excited to $_1G^4$ using the exciting light source. Fluorescence at the excited state was sensed with an InGaAs-PIN sensor at wavelengths identified with a $\frac{1}{8}$-m monochromator. The sensed fluorescence was analyzed by a lock-in amplifier connected to a computer.

Figure 9:
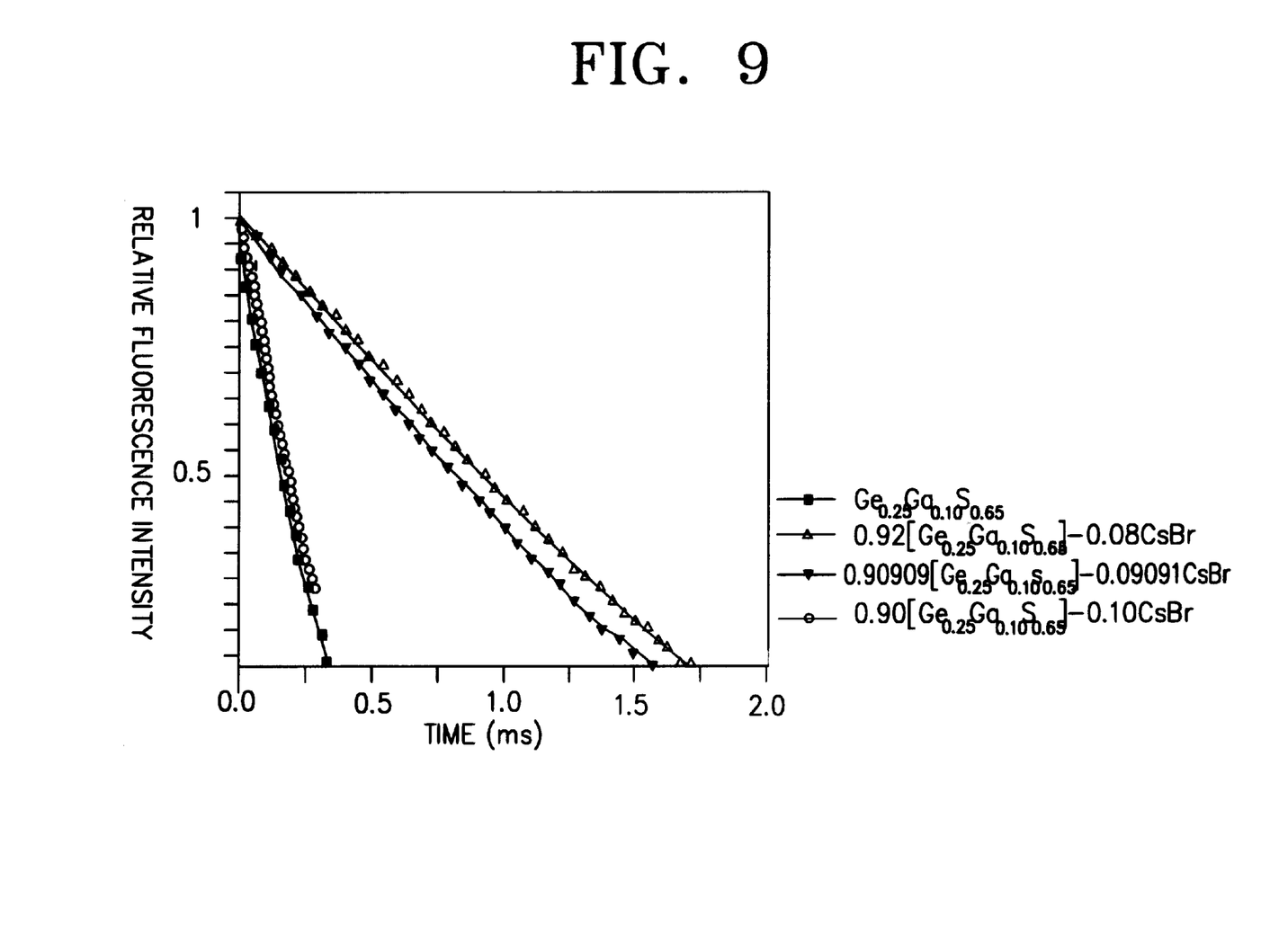
Figure 10:
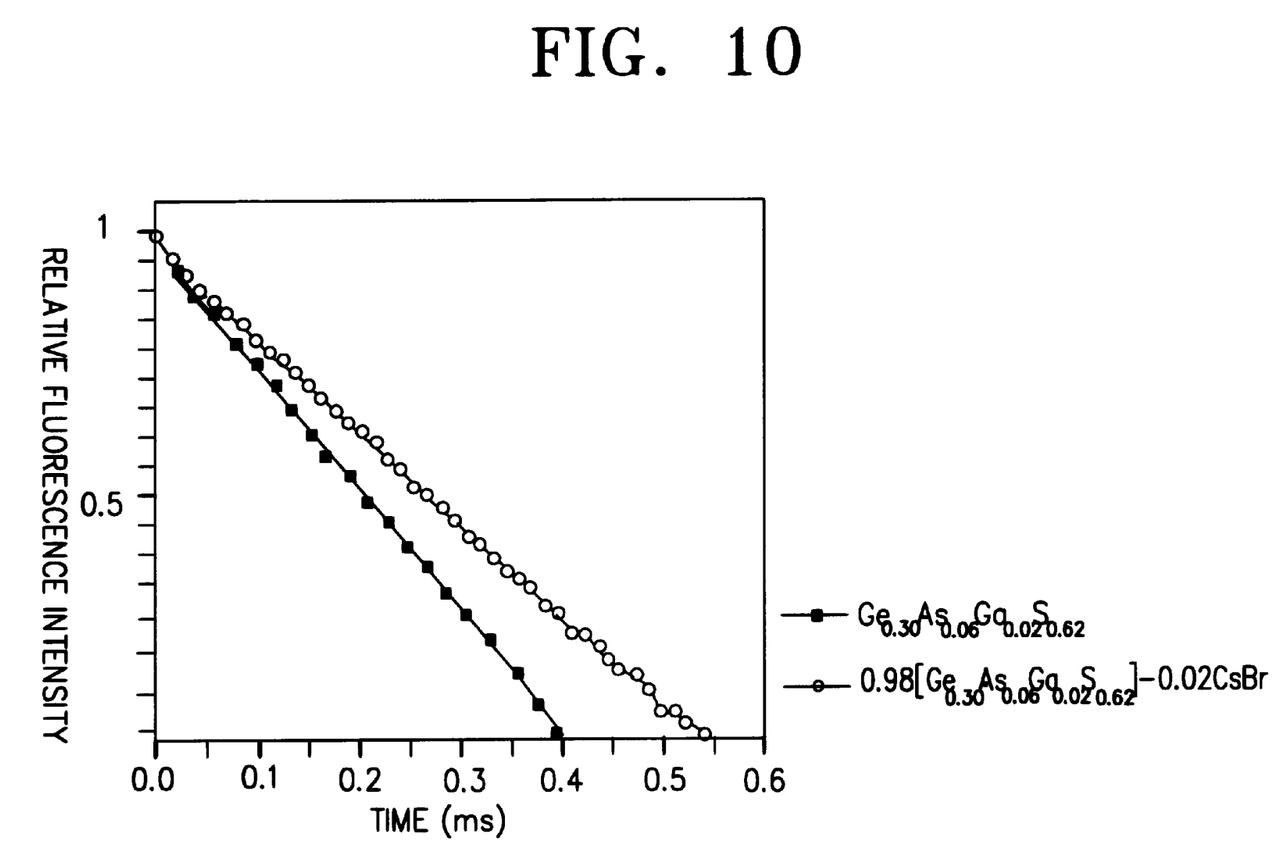

FIGS. 9 and 10 are graphs showing the fluorescence changes of sulfide glasses for an optical amplifier fabricated according to preferred embodiments of the present invention. FIG. 9 illustrates a comparison in fluorescence decrease between a conventional three-component system sulfide glass for an optical amplifier and a three-component system sulfide glass for an optical amplifier according to the embodiments of the present invention. FIG. 10 illustrates a comparison in fluorescence decrease between a conventional four-component system sulfide glass for an optical amplifier and a four-component system sulfide glass for an optical amplifier according to the embodiment of the present invention.

The fluorescence decrease curves were drawn with the decrements of fluorescence intensity measured by a digital oscilloscope versus time. The fluorescence lifetime is defined as time at which fluorescence intensity is a 1/e of an initial value.

As described above, the alkaloid halogen-doped sulfide glasses and the fabricating method thereof according to the embodiments of the present invention alleviate multiphonon relaxation, increasing the lifetime of fluorescence. Therefore, the sulfide glasses have high optical amplification efficiency.

While the invention has been shown and described with reference to certain preferred embodiments thereof, it will be understood by those skilled in the art that various changes in form and details may be made therein without departing from the spirit and the scope of the invention as defined by the appended claims.

What is claimed is:

1. An alkali halide-doped sulfide glass for an optical amplifier, comprising:
    a three-component system of Ge—Ga—S, said three-component doped with a $Pr^{3+}$ and an alkai halide,
    wherein said three-component system comprises a mixture of GeGaS and CsBr, expressed in terms of mole percent on the sulfide basis, and wherein said mixture is selected from the group consisting of 90–92% ($Ge_{0.25}Ga_{0.10}S_{0.65}$) and 8–10% (CsBr); 94.5–96.0% ($Ge_{0.29}Ga_{0.05}S_{0.66}$) and 4–5.5% (CsBr); and, 84.2–85.25% ($Ge_{0.18}Ga_{0.18}S_{0.64}$) and 14.75–15.75% (CsBr);
    wherein a specification concentration of $CsBr/GaS_{3/2} \geq 1$.

2. An alkali halide-doped sulfide glass for an optical amplifier, comprising:
    three-component system of Ge—Ga—S, said three-component doped with a $Pr^{3+}$ and an alkali halide,
    wherein the three-component system comprises a mixture of GeGaS and KBr, expressed in terms of mole percent on the sulfide basis, and wherein said mixture comprises 90.91% ($Ge_{0.25}Ga_{0.10}S_{0.65}$) and 9.09% (KBr).

3. An alkali halide-doped sulfide glass for an optical amplifier, comprising:
    a three-component system of Ge—Ga—S, said three-component doped with a
    $Pr^{3+}$ and an alkali halide,
    wherein the three-component system comprises a mixture of GeAsGaS and CsBr, expressed in terms of mole percent on the sulfide basis, and wherein said mixture comprises 98% ($Ge_{0.30}As_{0.06}Ga_{0.028}S_{0.62}$) and 2% (CsBr); and
    wherein a specification concentration of $CsBr/GaS_{3/2} \geq 1$.

4. An alkali halide-doped sulfide glass for an optical amplifier, comprising:
    a three-component system of Ge—Ga—S, said three-component doped with a $Pr^{3+}$, an alkali halide, and an As.

5. The $Pr^{3+}$ and alkali halide-doped sulfide glass of claim 4, wherein the alkali halide is CsBr.

6. The $Pr^{3+}$ and alkaloid halogen-doped sulfide glass of claim 4, wherein the alkaloid halogen is KBr.

7. The $Pr^{3+}$ and alkaloid halogen-doped sulfide glass of claim 4, wherein the three-component system comprises a mixture of GeAsGaS and CsBr, expressed in terms of mole percent on the sulfide basis, and said mixture comprises 98% ($Ge_{0.30}As_{0.06}Ga_{0.028}S_{0.62}$) and 2% (CsBr);

wherein a specification concentration of $CsBr/GaS_{3/2} \geqq 1$.

* * * * *